United States Patent
Hayes et al.

(10) Patent No.: US 7,185,688 B2
(45) Date of Patent: Mar. 6, 2007

(54) CENTRAL TIRE INFLATION SYSTEM FOR DRIVE AXLE

(75) Inventors: Brian D. Hayes, Newark, OH (US); Lawrence D. Brill, Westerville, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 94 days.

(21) Appl. No.: 10/765,291

(22) Filed: Jan. 27, 2004

(65) Prior Publication Data

US 2005/0161136 A1    Jul. 28, 2005

(51) Int. Cl.
  B60C 23/00    (2006.01)
(52) U.S. Cl. ..................... 152/417; 152/415
(58) Field of Classification Search .............. 152/415, 152/416, 417, 418; 301/126, 131, 124.1; 74/607
See application file for complete search history.

(56) References Cited

U.S. PATENT DOCUMENTS

| | | | |
|---|---|---|---|
| 839,626 A * | 12/1906 | Nielsen | 152/417 |
| 1,794,900 A * | 3/1931 | Hutchinson | 152/417 |
| 2,908,241 A | 10/1959 | Todd | |
| 3,405,952 A * | 10/1968 | Hertel et al. | 280/124.156 |
| 4,387,931 A | 6/1983 | Bland | |
| 4,431,043 A * | 2/1984 | Goodell et al. | 152/417 |
| 4,498,709 A * | 2/1985 | Wells et al. | 301/5.24 |
| 4,582,107 A * | 4/1986 | Scully | 152/417 |
| 4,641,698 A | 2/1987 | Bitonti | |

(Continued)

FOREIGN PATENT DOCUMENTS

DE    3619603    *    1/1987

(Continued)

OTHER PUBLICATIONS

"Moteur Hydraulique a Passage Central D'Air Comprime" Research Disclosure, Jun. 1994.

(Continued)

*Primary Examiner*—Russell D. Stormer
(74) *Attorney, Agent, or Firm*—Carlson, Gaskey, & Olds

(57) ABSTRACT

A tire inflation system for a portal drive axle assembly includes fluid flow passages that are formed within rotating wheel shafts, which drive a pair of wheel end assemblies. The portal drive axle assembly includes a driving input that drives a pair of axle shafts. A wheel gear assembly operably couples each axle shaft to the respective wheel shaft. The wheel gear assemblies transfer the driving force from the axle shafts to the wheel shafts, which are positioned at different vertical location relative to the axle shafts. A first end of each wheel shaft is in fluid communication with a vehicle air supply and a second end of each wheel shaft is in fluid communication with a tire assembly. Seal assemblies are mounted for rotation with the wheel shaft at the first end of the wheel shafts. An air supply needle is mounted to a non-rotating axle structure and includes a base member that is in fluid communication with the air supply and a hollow needle body that extends from the base member through the seal assembly and into the fluid flow passage. Thus, air is selectively supplied to the tire assemblies in a sealed environment by traveling from the air supply, through the rotating wheel shafts, and into the tire assemblies.

20 Claims, 5 Drawing Sheets

U.S. PATENT DOCUMENTS

| | | |
|---|---|---|
| 4,700,763 A | 10/1987 | Williams |
| 4,702,843 A | 10/1987 | Oswald et al. |
| 4,730,656 A | 3/1988 | Goodell et al. |
| 4,733,707 A | 3/1988 | Goodell et al. |
| 4,844,138 A | 7/1989 | Kokubu |
| 4,883,106 A | 11/1989 | Schultz et al. |
| 4,932,451 A | 6/1990 | Williams et al. |
| 5,236,028 A | 8/1993 | Goodell et al. |
| 5,244,027 A | 9/1993 | Freigang |
| 5,253,687 A | 10/1993 | Beverly et al. |
| 5,273,064 A | 12/1993 | Beverly et al. |
| 5,287,906 A | 2/1994 | Stech |
| 5,354,391 A | 10/1994 | Goodell et al. |
| 5,377,736 A | 1/1995 | Stech |
| 5,429,167 A | 7/1995 | Jensen |
| 5,535,516 A | 7/1996 | Goodell et al. |
| 5,538,062 A | 7/1996 | Stech |
| 5,584,949 A | 12/1996 | Ingram |
| 5,767,398 A | 6/1998 | Naedler |
| 5,769,979 A | 6/1998 | Naedler |
| 5,868,881 A | 2/1999 | Bradley |
| 6,105,645 A * | 8/2000 | Ingram ............ 152/415 |
| 6,122,996 A * | 9/2000 | Hauser et al. ........ 74/607 |
| 6,131,631 A | 10/2000 | Bradley |
| 6,145,559 A * | 11/2000 | Ingram, II ......... 152/417 |
| 6,260,595 B1 | 7/2001 | Cobb |
| 6,269,691 B1 | 8/2001 | Sowatzke |
| 6,283,186 B1 | 9/2001 | Krisher |
| 6,325,124 B1 * | 12/2001 | Colussi et al. ...... 152/417 |
| 6,394,159 B1 | 5/2002 | Cobb |
| 6,435,238 B1 | 8/2002 | Hennig |
| 6,484,774 B1 * | 11/2002 | Naedler ............ 152/417 |

FOREIGN PATENT DOCUMENTS

| | | |
|---|---|---|
| DE | 36 18 827 A1 | 12/1987 |
| FR | 2 509 230 | 1/1983 |
| JP | 52-41327 * | 3/1977 |
| WO | WO 01/02196 | 1/2001 |

OTHER PUBLICATIONS

European Search Report, Mar. 15, 2006.

* cited by examiner

CENTRAL TIRE INFLATION SYSTEM FOR DRIVE AXLE

BACKGROUND OF THE INVENTION

The subject invention relates to a central tire inflation (CTI) system that utilizes passages formed within rotating wheel shafts to provide an easily sealed flow path to conduct air from a vehicle air supply to a tire assembly on a drive axle. The passage in each wheel shaft includes a fluid inlet formed at an inboard shaft end that communicates with the air supply and a fluid outlet formed at an outboard shaft end that communicates with the tire assembly.

CTI systems automatically supply air to vehicle tires when certain predetermined conditions are met. In a typical situation, the CTI system will automatically add air to a tire that becomes under-inflated during vehicle operation. CTI systems typically include sensors and pressure regulators for monitoring the pressure in each of the vehicle's tires. When pressure in any tire drops below a predetermined level, the system automatically supplies air to that tire until a desired tire pressure is achieved.

CTI systems include an air tank that is mounted on the vehicle. Air is supplied from the tank to the tires by using various methods. CTI systems can be incorporated into drive or non-drive axles. Traditionally, for either type of axle, CTI systems include an air connection that allows air to be supplied from a non-rotating air source to rotating tires. Some systems include an air connection that is mounted for rotation with a wheel hub assembly at one end, and which is mounted at an opposite end to a non-rotating axle tube for a non-drive axle. In these systems, air is supplied from the tank to an interior of the axle tube. Air from inside the axle passes through the air connection and is conducted to the rotating tires.

Traditionally, CTI systems for drive axles have been more difficult to incorporate into conventional wheel ends. Typically, these CTI systems use drilled passageways in rotating wheel hubs in combination with drilled passageways in non-rotating spindles. This configuration requires large, expensive seals, is difficult to assemble, and is expensive to machine. Further, wheel hubs for drive axles using disc brakes and single tires often do not have enough packaging space to accommodate drilled passageways. Thus, using a CTI system for such a configuration is not practical.

Another disadvantage with CTI systems that utilize passageways formed within the wheel hub, is interference with wheel bearing operation. Typically, the wheel hub is supported for rotation relative to the spindle on a pair of bearings. These bearings must be properly lubricated in order to operate efficiently and effectively. Forming an air passageway through the hub can be detrimental to bearing operation, especially if one of the seals fails or leaks. Further, the industry is moving toward the use of unitized bearings, which require a permanently sealed unit. Conveying air through the bearing unit is contrary to this concept.

Other CTI systems for drive axles have utilized a pair of drilled passageways formed within a rotating axle shaft. A radial air passage is drilled into the axle shaft to connect with a laterally extending passage. An air coupling surrounds the axle shaft at the radial air passage location to provide a sealed circumferential air compartment between an external surface of the rotating axle shaft and an interior surface of the air coupling. Air is transferred from the air source and into the radial passageway by way of the air compartment.

This system has several disadvantages. The air coupling is a complex mechanism requiring several component pieces and multiple seals, which makes the coupling very expensive. Further, assembling the coupling onto the axle shaft is difficult and time consuming. Also, the system is difficult to maintain and repair.

A more cost effective CTI system for a drive axle is needed. The system must be easily incorporated into the drive axle without requiring extensive machining, assembly, or requiring passageways formed within the rotating wheel hub. Further, the system should be easy to maintain and repair as well as overcoming the other above-mentioned deficiencies with prior art systems.

SUMMARY OF THE INVENTION

A tire inflation system for a vehicle wheel end assembly includes a driving input member and a driven output member. The output member includes a wheel shaft that drives a wheel hub and tire assembly about a wheel axis of rotation. The wheel shaft includes a laterally extending bore that defines a fluid inlet at a first end, which is in fluid communication with a vehicle air supply, and a fluid outlet at a second end, which is in fluid communication with the tire assembly. An air supply component cooperates with the vehicle air supply to transfer air from a non-rotating vehicle structure to the bore that is formed in the rotating wheel shaft. A seal assembly is mounted for rotation with the first end of the wheel shaft to provide a sealed environment as air is transferred from the non-rotating structure to the rotating wheel shaft.

In one disclosed embodiment, the bore extends through the entire length of the wheel shaft from a first end face to a second end face. The air supply component includes a base portion that is mounted to non-rotating wheel structure and an air conduit that extends from the base portion and into the bore at the first end face. Preferably, the fluid inlet and fluid outlets are coaxial with the laterally extending bore. By forming the bore within the wheel shaft, air is easily supplied to the tire assembly for a driven wheel without interfering with the wheel bearings and without requiring passages to be drilled into the wheel hub itself.

In one disclosed embodiment, the subject invention is incorporated into an inverted portal drive axle. The inverted portal drive axle includes an input driven by a vehicle power source and defining a longitudinal axis. The input is operably coupled to a differential, which is in driving engagement with first and second axle shafts. In an inverted portal axle configuration, the input is positioned laterally closer to one wheel assembly than the other wheel assembly, thus, one of the first or second axle shafts is significantly longer than the other axle shaft. Each axle shaft drives a gear set that raises the driving input from a lower axle shaft level up to a higher wheel axis level. The gear sets drive the wheel shafts, which in turn drive the wheel hubs. In this axle configuration, the bore is coaxial with the wheel axis of rotation, which is parallel to and spaced apart from an axle shaft axis of rotation. The fluid inlets at the inboard ends of the wheel shafts are easily accessed through a non-rotating gearbox or axle housing. Thus, the air supply component can be easily installed to communicate with the wheel shaft bore without interfering with other wheel components and without requiring significant wheel modifications. A connector and hose assembly are operably coupled to each fluid outlet at the outboard end of the wheel shafts to conduct the air to the tire assemblies.

The seal assembly cooperates with the first or inboard end face of the rotating wheel shaft. The seal assembly includes a seal body and at least one resilient seal member, which are mounted for rotation with the wheel shaft. The seal body is at least partially received within a secondary bore formed at the inboard end face. The secondary bore is preferably coaxial with the laterally extending bore and is of greater diameter than the bore. The resilient seal is supported and held in place by the seal body to provide a sealed air path as air flows from the air supply, through the air conduit, through the laterally extending bore, and out to the tire assemblies.

The subject invention utilizes the wheel shaft to provide a single, easily sealed airflow passage for a tire inflation system that can be incorporated into many different types of wheel configurations. The system is simple to maintain because the wheel hub does not have to be removed in order to repair or replace any tire inflation system component. Further, when compared to traditional tire inflation systems, the subject invention utilizes smaller, less complex, and less expensive components. These and other features of the present invention can be best understood from the following specification and drawings, the following of which is a brief description.

DETAILED DESCRIPTION OF THE PREFERRED EMBODIMENT

Figure 1:
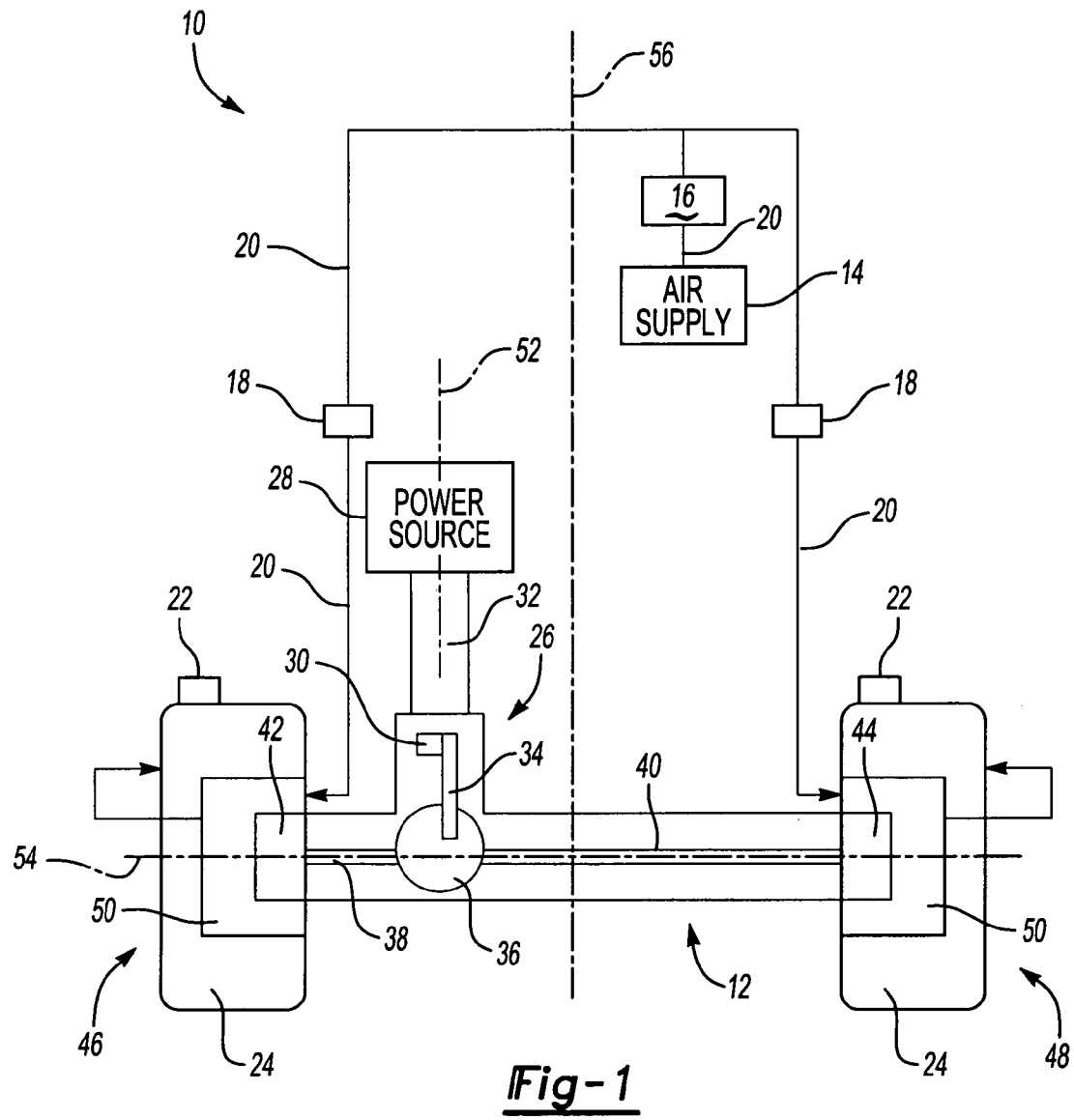
FIG. 1 is a schematic view of a drive axle assembly a with a CTIS incorporating the subject invention.

FIG. 1 shows a schematic view of a central tire inflation (CTI) system 10 incorporated into a drive axle assembly 12. Preferably, the drive axle assembly 12 is an inverted portal drive axle, however, the CTI system 10 could be used in portal drive axles, or other similar drive axles known in the art. The CTI system 10 includes an air supply 14 that is carried by a vehicle or a vehicle trailer. The air supply 14 can be an existing air supply tank on the vehicle, such as for a pneumatic braking system, for example, or can be a separate air supply dedicated to the CTI system 10.

The CTI system 10 also includes a plurality of pressure valves and sensors that are used to monitor tire pressure, air supply pressure, and to control air flow throughout the CTI system 10. In one example shown in FIG. 1, the CTI system 10 includes a pressure regulator and unloader valve assembly 16. The pressure regulator is typically set at a desired tire pressure level. The unloader valve is set at a lower pressure and prevents air from being supplied to a tire if there is a tire blowout. The unloader valve is normally open, however, if pressure output from the pressure regulator falls below a certain pressure level, the valve closes to prevent depletion of the air supply in a tire blowout situation. Check valves 18 can be used in addition to the pressure regulator unloader valve assembly 16 to permit only one-way flow in the system. The CTI system 10 can also include hose pressure lines 20 that interconnect the air supply 14, pressure regulator and unloader valve assembly 16, and check valves 18 to the axle assembly 12. Optionally, or in addition to the components discussed above, pressure sensors 22 can be used at each tire assembly 24 to individually monitor tire pressure. It should be understood that these are just examples of certain types of valves, regulators, and sensors that could be used in the CTI system 10. Other CTI components known in the art could also be used in place of, or in addition to, the components discussed above.

The inverted portal drive axle assembly 12 includes an input 26 that is operably coupled to a driving power source 28, such as an engine or electric motor. In one disclosed embodiment, the input 26 includes a pinion gear 30, which is driven by a driveshaft 32 coupled to the power source 28. The pinion gear 30 drives a ring gear 34, which is operably coupled to a differential gear assembly 36. First 38 and second 40 axle shafts are coupled to the differential gear assembly 36, which provides for axle shaft speed differentiation as the vehicle executes turning maneuvers. The first 38 and second 40 axle shafts drive first 42 and second 44 wheel gear assemblies, which in turn drive first 46 and second 48 wheel end assemblies.

The first 46 and second 48 wheel end assemblies each include a wheel hub 50 that supports the tire assembly 24. The tire assembly 24 can include a single tire or can include a plurality of tires positioned at each wheel end assembly 46, 48 depending on the type of vehicle application.

In an inverted portal axle configuration, the input 26 is off-center, i.e. is closer to one wheel end assembly 46, 48 than the other wheel end assembly 46, 48. This means that one of the first 38 and second 40 axle shafts is substantially longer than the other of the first 38 and second 40 axle shafts. As shown in FIG. 1, the driveshaft 32 defines a longitudinal axis of rotation 52 and the axle shafts 38, 40 define an axle shaft axis of rotation 54 that is transverse to the longitudinal axis of rotation 52. An axle housing 58 surrounds and encloses the axle shafts 38, 40 and extends underneath a vehicle from the first wheel end assembly 46 to the second wheel end assembly 48. Due to the off-center location of the input 26, the longitudinal axis of rotation 52 is also positioned off-center, i.e. is spaced apart from a longitudinal vehicle centerline 56. This configuration allows a vehicle floor (not shown) to be positioned vertically lower to ground level than with a traditional drive axle configuration. This is especially useful in passenger carrying vehicle applications, such as buses, for example.

Figure 2:
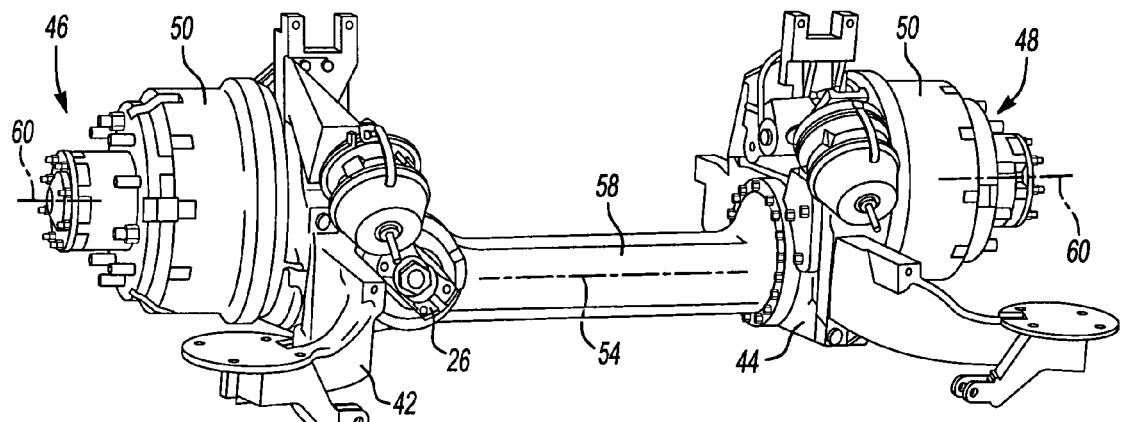
FIG. 2 is a perspective view of the axle assembly of FIG. 1.

A perspective view of the inverted drive portal drive axle assembly 12 is shown in FIG. 2. Each wheel end assembly 46, 48 defines a wheel axis of rotation 60 that is vertically higher relative to ground level than the axle shaft axis of rotation 54. Thus, the driving input power or torque is transferred from the input 26, at a vertically lower position, up to drive the wheel end assembly 46, 48, at a vertically higher position. This transfer is achieved by the use of the first 42 and second 44 wheel gear assemblies.

Figure 3:
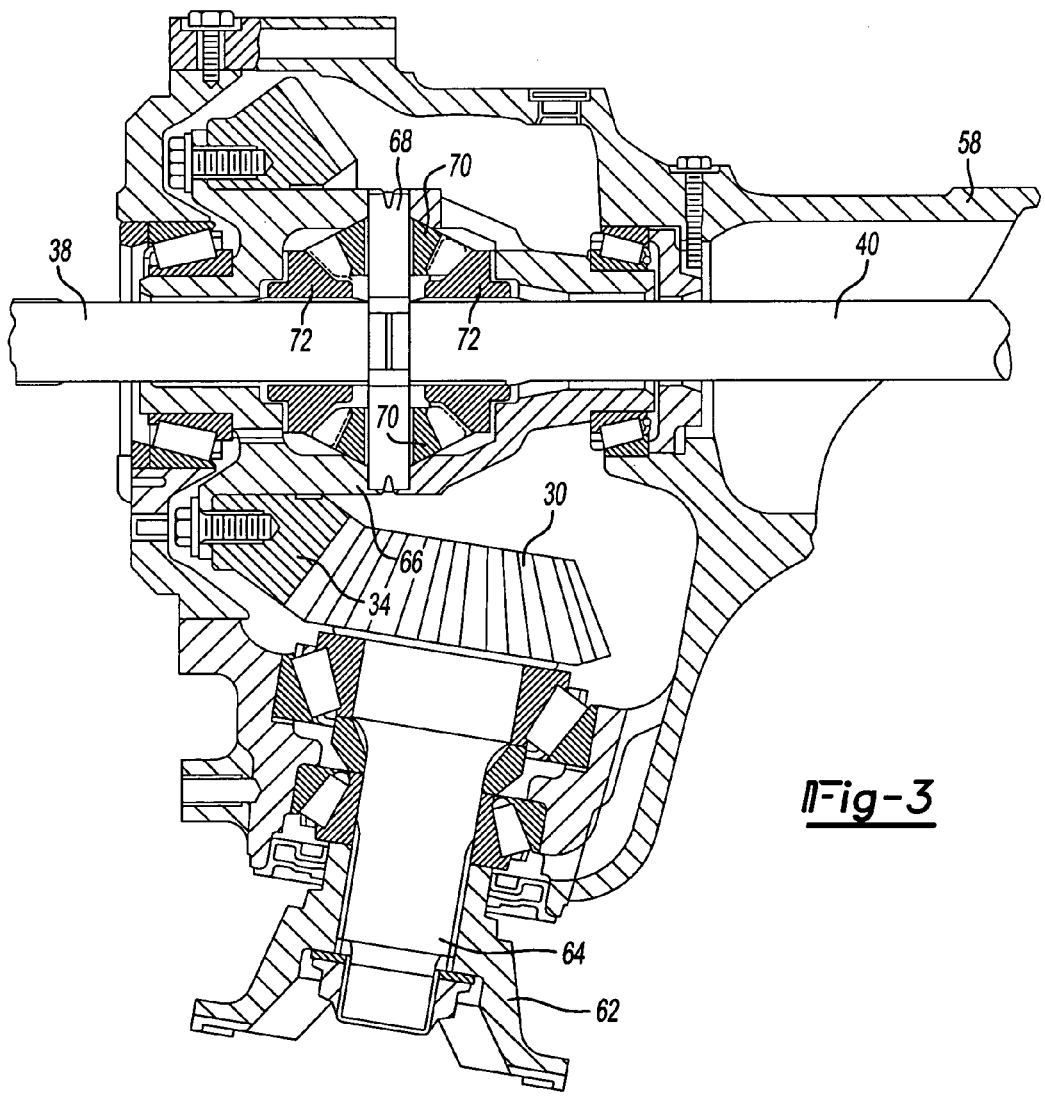
FIG. 3 is a cross-sectional view of an axle input for the drive axle assembly shown in FIG. 2.

The input 26 and differential gear assembly 36 are shown in greater detail in FIG. 3. As discussed above, the input 26 includes a pinion gear 30 that drives a ring gear 34. A yoke assembly 62 couples a shaft 64, which supports the pinion gear 30, to the driveshaft 32. The ring gear 34 is bolted to a differential housing 66 that supports a four-legged spider 68 (only two legs are shown). A pinion gear 70 is supported on each leg of the spider 68. The pinion gears 70 mesh with side gears 72 that are splined to the axle shafts 38, 40.

Figure 4:
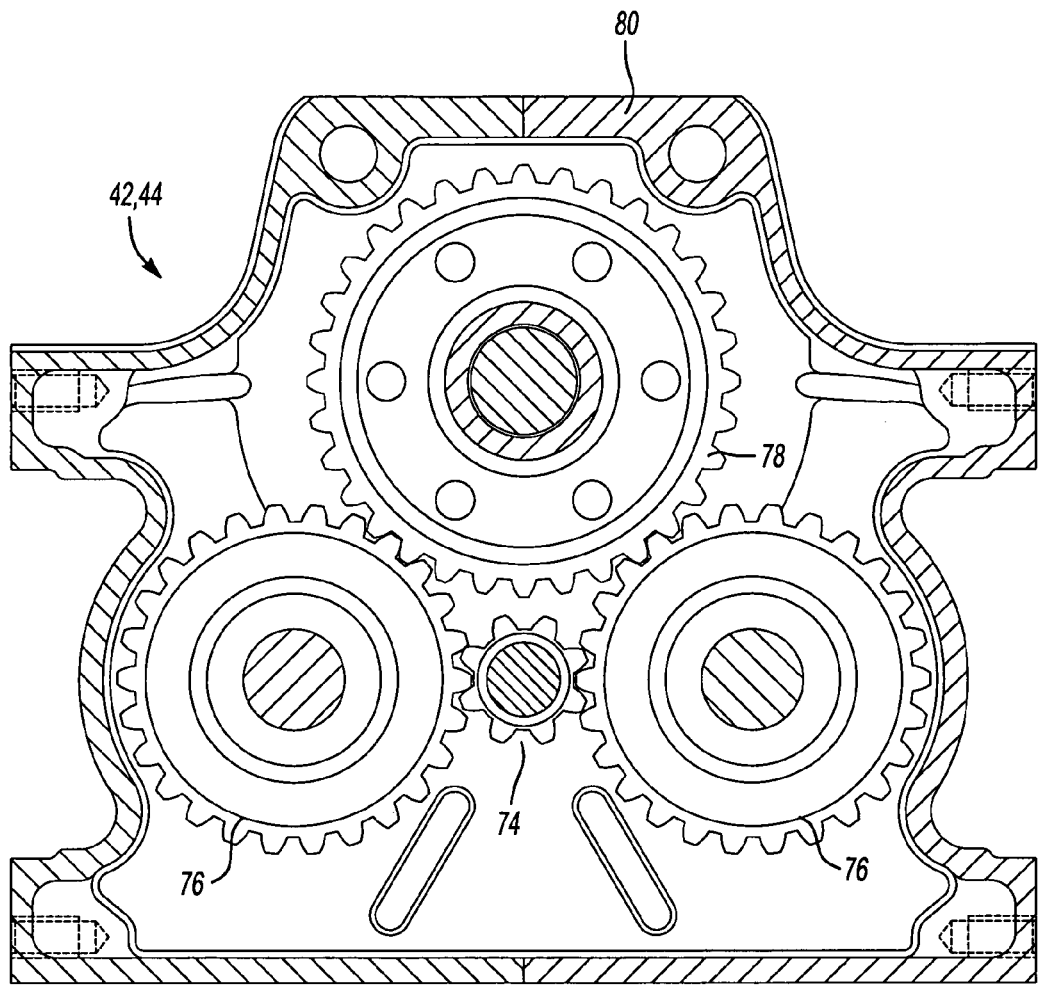
FIG. 4 is a cross-sectional view of a wheel gear assembly shown in FIG. 2.

Each of the axle shafts 38, 40 drives one of the first 42 or second 44 wheel gear assemblies. The first 42 and second 44 wheel gear assemblies are preferably helical gear assemblies that each include a helical pinion gear or wheel input drive gear 74 driven by one of the axle shafts 38, 40, see FIG. 4. The input drive gear 74 is in meshing engagement with a pair of helical idler gears 76, which in turn are in meshing engagement with a helical driven gear or wheel output driven gear 78. The gears 74, 76, and 78 are enclosed within a gear housing 80 that is supported by the axle housing 58. It should be understood that the helical gear assembly shown in FIG. 4 is just one example of a wheel gear assembly, and that other wheel gear assemblies known in the art could also be used.

The output driven gears 78 drive the wheel shafts 82 that are coupled to the wheel hubs 50. The wheel shafts 82 define the wheel axes of rotation 60. The wheel gear assemblies 42, 44 raise the driving input from the vertically lower first 38 and second 40 axle shafts to the vertically higher wheel shafts 82. The wheel axes of rotation 60 are parallel to and spaced apart from the axle shaft axes of rotation 54, and are transverse to the longitudinal axis of rotation 52. Thus, the input drive gears 74 are coaxial with the axle shaft axes of rotation 54, and the output driven gears 78 are coaxial with the wheel axes of rotation 60.

Figures 5A, 5B:
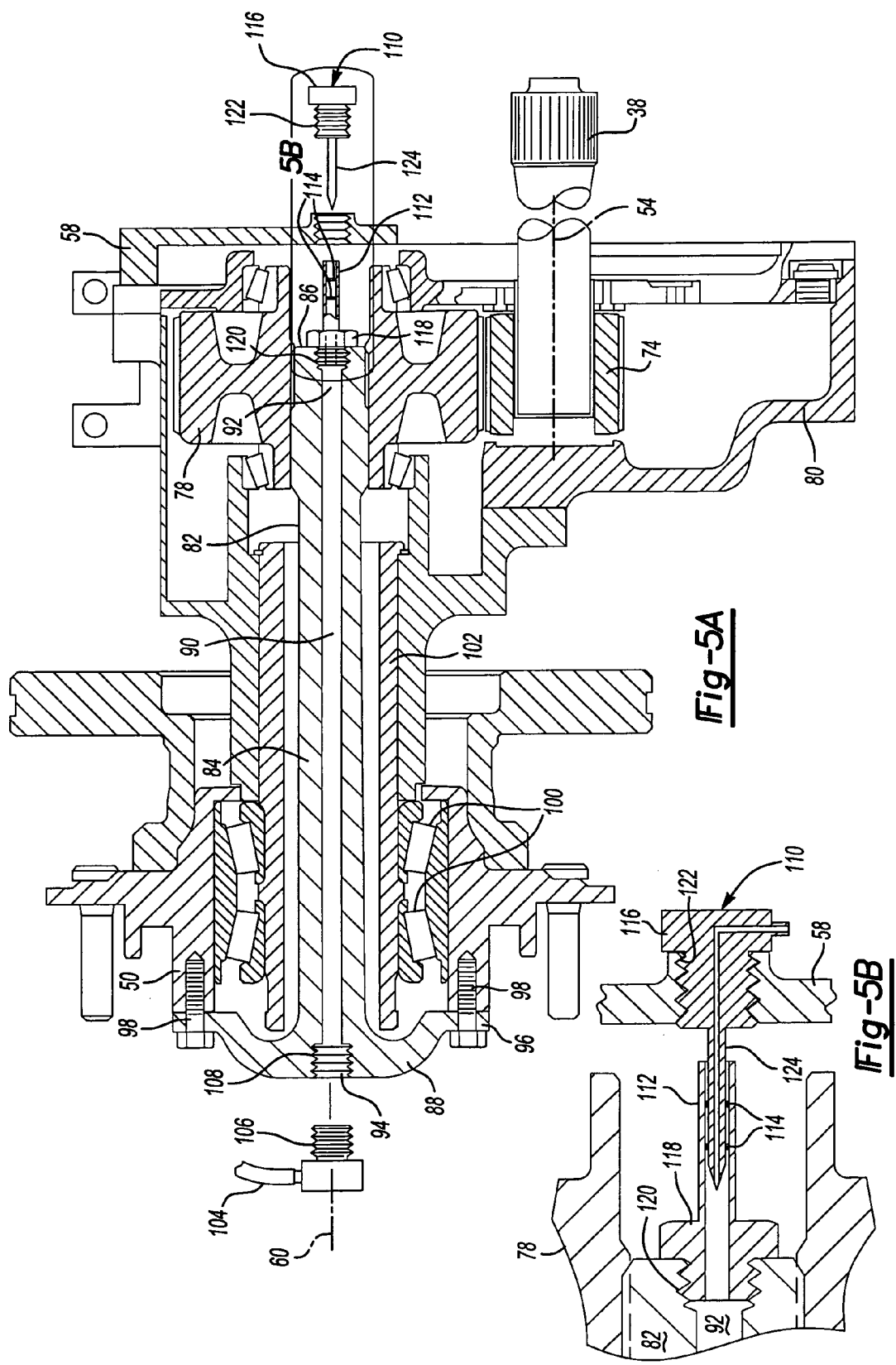
FIG. 5A is a cross-sectional view of a wheel end assembly for the drive axle assembly of FIG. 2, incorporating one disclosed embodiment of the subject invention.
FIG. 5B is one disclosed embodiment of an air supply component for the CTIS incorporating the subject invention.

As shown in FIGS. 5A and 5B, the wheel shafts 82 each include a cylindrical shaft body 84 that has a first end face 86 and a second end face 88. A laterally extending bore 90 forms a fluid passage within the shaft body 84 that is in fluid communication with the air supply 14. The bore 90 is preferably coaxial with the wheel axis of rotation 60 and extends through the entire length of the wheel shaft 82. The bore 90 has a fluid inlet 92 formed at the first end face 86, which is in fluid communication with the air supply 14. The bore 90 has a fluid outlet 94 formed at the second end face 88, which is in communication with the tire assembly 24. The fluid inlet 92 and the fluid outlet 94 are both coaxial with the bore 90.

The second end face 88 includes a radially extending flange portion 96 that is mounted to an end face of the wheel hub 50 with a plurality of fasteners 98. The wheel hub 50 is rotatably supported by a pair of wheel bearings 100 for rotation relative to a non-rotating spindle 102, which is supported by the gear housing 80.

A tee connection and hose assembly 104 is mounted to the second end face 88 of the wheel shaft 82. The tee connection and hose assembly 104 transfers air from the bore 90 to the tire assembly 24. In one disclosed embodiment, the tee connection and hose assembly 104 includes a threaded body portion 106 that is received within a threaded portion 108 of the wheel shaft 82. While a threaded attachment is preferred, any other connection and hose assembly known in the art and any known attachment method could be used to form the air connection from the second end face 88 to the tire assembly 24.

An air supply component assembly 110 is used to interconnect the air supply 14 to the first end face 86 of the wheel shaft 82. In the embodiment shown in FIG. 5, the air supply component assembly 110 includes a tube 112 mounted for rotation with the wheel shaft 82, a pair of resilient seals 114 mounted within the tube 112, and an air supply needle 116 mounted to a non-rotating wheel or axle component such as the axle housing 58. The tube 112 includes a threaded end portion 118 that is threaded into a secondary bore 120 formed within the first end face 86 of the wheel shaft 82. The secondary bore 120 has a larger diameter than bore 90. The air supply needle 116 includes a threaded base portion 122 that is attached to the axle housing 58 and a hollow needle portion 124 that extends from the base portion 122. The needle portion 124 extends into the tube 112 and is resiliently engaged by the seals 114.

When tire pressure falls below a predetermined level, air is supplied from the air supply 14, through the needle portion 124, and into the bore 90. The air then flows from the bore 90, through the tee connection and hose assembly 104, and into the tire assembly 24.

This configuration provides a sealed rotary connection to transfer air from a non-rotating component to a rotating component. Further, the configuration accomplishes the air transfer without having to drill fluid passages in the wheel hub 50 or spindle 102.

Figure 6:
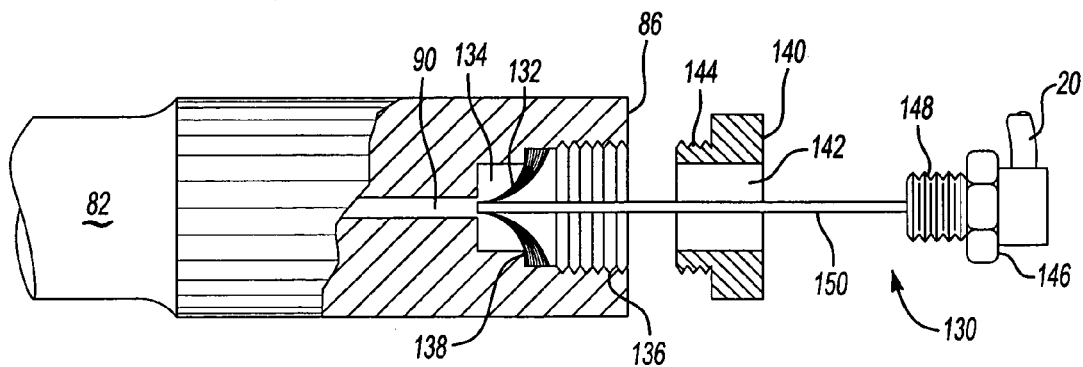
FIG. 6 is another disclosed embodiment of an air supply component for the CTIS incorporating the subject invention.

An alternate embodiment of the air supply component assembly is shown generally at 130 in FIG. 6. The air supply component assembly 130 includes a resilient gland seal 132 that is received within a secondary bore 134 formed within the first end face 86 of the wheel shaft 82. The secondary bore 134 is coaxial and of larger diameter than bore 90. The secondary bore 134 includes a threaded portion 136 and a seal seat portion 138.

A gland nut 140, defining a central bore 142, has an external threaded portion 144 that mates with bore threaded portion 136. The gland seal 132 is seated on the seat portion 138 and is held in place by the gland nut 140. Thus, the gland seal 132 and gland nut 140 are mounted for rotation with the wheel shaft 82.

An air supply needle 146, similar to that described above, is mounted to the axle housing 58. The air supply needle 146 includes a threaded base portion 148 that is attached to the axle housing 58 and a hollow needle portion 150 that extends from the base portion 148. The needle portion 150 extends through the central bore 142 and into bore 90. The needle portion 150 pierces or is inserted through a small opening formed within the gland seal 132 such that the gland seal 132 resiliently engages the needle portion 150 to provide a sealed rotary connection. Air flows from the air supply 14, through the hose pressure lines 20, through the needle portion 150, and into the bore 90.

Figure 7:
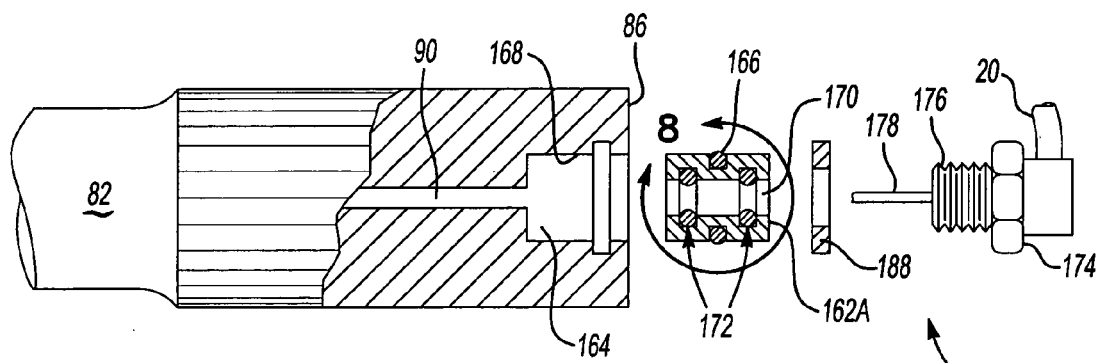
FIG. 7 is yet another disclosed embodiment of an air supply component for the CTIS incorporating the subject invention.

An alternate embodiment of the air supply component assembly is shown generally at 160 in FIG. 7. The air supply component assembly 160 includes a seal body 162 that is received within a secondary bore 164 formed in the first end face 82 of the wheel shaft 82. The secondary bore 164 is coaxial with and is larger in diameter than bore 90. The seal body 162 is mounted for rotation with the wheel shaft 82 and includes an external seal 166 positioned between the seal body 162 and secondary bore walls 168. The seal body 162 defines an internal bore 170 that is in fluid communication with bore 90. A pair of seals 172 is mounted within the internal bore 170.

An air supply needle 174, similar to that described above, is mounted to the axle housing 58. The air supply needle 174 includes a threaded base portion 176 that is attached to the axle housing 58 and a hollow needle portion 178 that extends from the base portion 176. The needle portion 178 extends through the internal bore 170 and into bore 90. The needle portion 178 resiliently engages seals 172 to provide a sealed rotary connection. Air flows from the air supply 14, through the hose pressure lines 20, through the needle portion 178, and into the bore 90.

Figure 8:
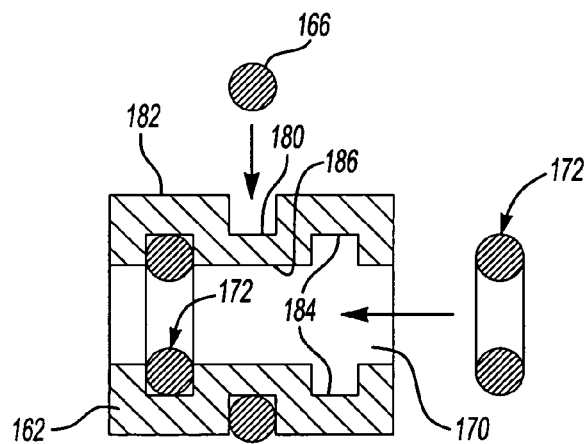
FIG. 8 is a magnified view of the seal body shown in FIG. 7.

As shown in FIG. 8, the seal body 162 includes an external groove or channel 180 that is circumferentially formed about an external surface 182 of the seal body 162. The external seal 166 is received within the channel 180. A pair of internal grooves or channels 184 is circumferentially formed within bore walls 186 of the seal body 162. The seals 172 are received within these channels 184. Preferably, the external seal 166 is a large o-ring seal and the seals 172 comprise smaller o-ring seals, however, other similar types of seals known in the art could also be used. A snap ring 188 holds the seal body 162 in place.

While FIGS. 5–8 show various examples of air supply component assemblies, it should be understood that other air supply component assemblies could also be used to provide a sealed rotary connection between the non-rotating axle housing 58 and the rotating wheel shaft 82. By forming a single bore 90 extending through the center of the wheel shaft 82, a simple method of providing a CTI system 10 for an inverted portal drive axle is achieved. The interface between the bore 90 and the air supply 14 can be simply and easily installed in this configuration. Further, the relatively short wheel shaft 82 is used to provide a single, easily sealed bore 90 for conventional spindle configurations or unitized wheel bearing configurations. The system 10 is simple to maintain, requiring no removal of the wheel hub 50 to repair or replace any CTI component. Compared to traditional CTI systems, the subject invention utilizes components that are small, simple, and inexpensive.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A tire inflation system and a wheel end assembly comprising:
   an input for coupling to a driving power source;
   an output driven by said input, said output including a wheel shaft coupled to a wheel hub for rotation about a wheel axis wherein said wheel shaft includes a laterally extending bore having a first end to be in fluid communication with an air source and a second end to be in fluid communication with a tire assembly to be mounted for rotation with said wheel hub;
   wherein said wheel shaft includes a first end face defining a fluid inlet to be in communication with the air source and a second end face defining a fluid outlet to be in communication with the tire assembly, said laterally extending bore extending through the entire length of said wheel shaft from said first end face to said second end face; and
   a seal assembly cooperating with said first end of said laterally extending bore to provide a sealed air flow path to extend from the air source, through said laterally extending bore, and to the tire assembly.

2. The system set forth in claim 1 wherein said laterally extending bore is parallel to said wheel axis.

3. The system set forth in claim 1 wherein said fluid inlet and said fluid outlet are coaxial with said laterally extending bore.

4. The system set forth in claim 1 including an air supply component having a base member to be in fluid communication with the air supply and mounted to a non-rotating wheel component and an air conduit extending from said base member, through said seal assembly, and into said laterally extending bore.

5. The system set forth in claim 4 wherein said seal assembly includes a resilient gland seal received within said laterally extending bore and mounted for rotation with said wheel shaft, a gland nut attached to said first end face of said wheel shaft and defining an internal nut bore wherein said air conduit extends through said internal nut bore and is engaged by said resilient gland seal to define a seal interface.

6. The system set forth in claim 4 wherein said wheel shaft includes a secondary bore at said first end face, said secondary bore having a greater diameter than said laterally extending bore and wherein said seal assembly includes a seal body defining an internal seal bore, at least one internal seal received within said internal seal bore, and at least one external seal surrounding an external surface of said seal body, said seal body being mounted within said secondary bore with said air conduit extending through said internal seal bore to sealingly engage said at least one internal seal.

7. The system set forth in claim 6 wherein said seal body includes a channel formed around said external surface to receive said external seal and establish sealing engagement between said seal body and said secondary bore and wherein said at least one internal seal comprises first and second o-rings mounted within first and second grooves formed within said internal seal bore, said first and second o-rings being positioned on opposite sides of said at least one external seal.

8. The system set forth in claim 4 wherein said seal assembly includes a tube mounted at said first end face for rotation with said wheel shaft and at least one resilient seal received within said tube, said air conduit extending through said tube to sealingly engage said at least one resilient seal.

9. The system set forth in claim 1 wherein said input comprises an axle shaft defining an axle shaft axis of rotation that is parallel to and spaced apart from said wheel axis.

10. The system set forth in clam 1 wherein said seal assembly includes at least one seal component that is mounted to an end of said wheel shaft.

11. The system set forth in claim 1 wherein said seal assembly is at least partially received within said laterally extending bore.

12. A tire inflation system and a drive axle comprising:
    an input coupled to a driving power source that defines a longitudinal axis;
    first and second wheel shafts driven by said input and defining a wheel axis that is transverse to said longitudinal axis;
    first and second wheel hubs driven by said first and second wheel shafts for rotation about said wheel axis, said first and second wheel hubs each adapted to support a tire assembly wherein each of said first and second wheel shafts comprises a cylindrical shaft body having a first end face and a second end face with a fluid passage extending through the length of said cylindrical shaft body from said first end face to said second end face to define a fluid inlet in fluid communication with an air supply at said first end face and a fluid outlet in fluid communication with the tire assembly at said second end face; and
    a first seal assembly cooperating with said first end face of said first wheel shaft, and a second seal assembly cooperating with said first end face of said second wheel shaft to provide a sealed air flow path extending from the air supply, through said fluid passages, and to the tire assemblies.

13. The system of claim 12 wherein each of said first and second wheel shafts includes an air supply component mounted to a non-rotating axle component, said air supply component including a base member in fluid communication with the air supply and an air conduit extending from said base member, through a respective one of said first and second seal assemblies, and into said fluid passage.

14. The system of claim 13 wherein said first and second wheel shafts each include a bore formed at said first end face, said bore being concentric with said fluid passage and having a greater diameter than said fluid passage and wherein said first and second seal assemblies each include a member mounted at least partially within said bore for rotation with a respective one of said first and second wheel shafts and at least one resilient seal member cooperating with said member to sealingly engage said air conduit.

15. The system of claim 14 wherein said input comprises a first axle shaft operably coupled to drive said first wheel shaft and a second axle shaft operably coupled to drive said second wheel shaft, said first and said second axle shafts defining an axle shaft axis of rotation that is parallel to and spaced apart from said wheel axis with each said fluid passage of said first and second wheel shafts being parallel to said wheel axis.

16. The system of claim 15 wherein said fluid inlet and fluid outlet are coaxial with said fluid passage.

17. A tire inflation system and a portal drive axle comprising:
an input for coupling to a driving power source and defining a longitudinal axis;
a differential driven by said input;
first and second axle shafts operably coupled to said differential and defining an axle axis that is transverse to said longitudinal axis;
first and second wheel gear sets driven by said first and second axle shafts;
first and second wheel shafts driven by said first and second wheel gear sets, said first and second wheel shafts defining a wheel axis that is transverse to said longitudinal axis, and parallel to and spaced apart from said axle axis;
first and second wheel hubs driven by said first and second wheel shafts for rotation about said wheel axis, said first and second wheel hubs each adapted to support a tire assembly wherein each of said first and second wheel shafts includes an internally formed fluid passage having a fluid inlet to be in fluid communication with an air supply and a fluid outlet to be in fluid communication with the tire assembly wherein said first and second wheel shafts each comprise a cylindrical shaft body having a first end face and a second end face with said internally formed fluid passage extending through the length of said cylindrical shaft body from said first end face to said second end face to define said fluid inlet at said first end face and said fluid outlet at said second end face; and
a first seal assembly cooperating with said fluid inlet of said first wheel shaft and a second seal assembly cooperating with said fluid inlet of said second wheel shaft, to provide a sealed air flow path to extend from the air supply, through said internally formed fluid passages, and to each tire assembly.

18. The system of claim 17 wherein said wheel axis is vertically higher relative to ground level than said axle axis.

19. The system of claim 18 wherein one of said first and second axle shafts is substantially longer than the other of said first and second axle shafts.

20. The system of claim 17 wherein each of said first and second wheel shafts includes an air supply component mounted to a non-rotating axle component, said air supply component including a base member in fluid communication with the air supply and an air conduit extending from said base member, through a respective one of said first and second seal assemblies, and into said internally formed fluid passage.

* * * * *